(12) United States Patent
Bell et al.

(10) Patent No.: US 7,337,435 B2
(45) Date of Patent: Feb. 26, 2008

(54) EFFICIENT CONFIGURATION DATA MIGRATION TECHNIQUE

(75) Inventors: Jon Anthony Bell, Raleigh, NC (US); William Frank Chambers, Apex, NC (US); Michael Jon Fox, New Hill, NC (US); David Yu Pin Yang, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 10/042,794

(22) Filed: Jan. 9, 2002

(65) Prior Publication Data

US 2003/0130980 A1 Jul. 10, 2003

(51) Int. Cl.
*G06F 9/45* (2006.01)
*G06F 9/44* (2006.01)

(52) U.S. Cl. ........................... 717/136; 717/121
(58) Field of Classification Search ................ 717/121, 717/136, 171–178

See application file for complete search history.

(56) References Cited

U.S. PATENT DOCUMENTS

| 5,969,704 | A | * | 10/1999 | Green et al. ................ 345/634 |
| 6,161,176 | A | * | 12/2000 | Hunter et al. ................. 713/1 |
| 6,430,622 | B1 | * | 8/2002 | Aiken et al. ................ 709/245 |
| 6,728,877 | B2 | * | 4/2004 | Mackin et al. .............. 713/100 |
| 6,757,720 | B1 | * | 6/2004 | Weschler, Jr. ............... 709/220 |

OTHER PUBLICATIONS

IBM z/OS VIR2.0 CS: IP Configuration Guide, document No. SC31-8775-01, 8 pages, Oct. 31, 2001, (JJR *Jul. 11, 2004)* added document date.
IBM z/OS CS—Sjare om <ommea [p;os—2001, Session 3603 What's New in z/OS Communications Server? 3 slides.
IBM z/OS VIR2.0 Communications Server Enhancements, web 2 pgs.

* cited by examiner

*Primary Examiner*—Tuan Dam
*Assistant Examiner*—John Romano
(74) *Attorney, Agent, or Firm*—Myers Bigel Sibley & Sajovec PA; Stephen Calogero

(57) ABSTRACT

Methods, systems, and computer program products for migrating configuration data from an existing program to a replacement program, in response, for example, to a command by an external agent. In preferred embodiments, an existing program is modified according to the invention to add functionality to obtain pertinent configuration data from such sources available to the existing program as its internal tables, configuration files, and run-time commands, and then to write a configuration file containing configuration data formatted for use by the replacement program. The program's internal tables may often contain configuration data which is not always available to the replacement program e.g. command line parameters, data provided through receipt of messages from other programs, etc. The invention advantageously makes voluminous formatted configuration data available to the replacement program in order to expeditiously provide a basis for its initial operation after installation.

5 Claims, 3 Drawing Sheets

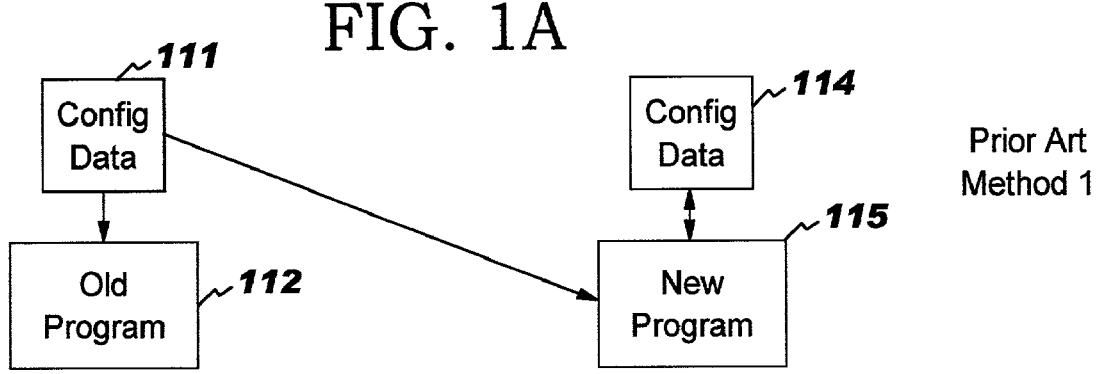
FIG. 1A — Prior Art Method 1
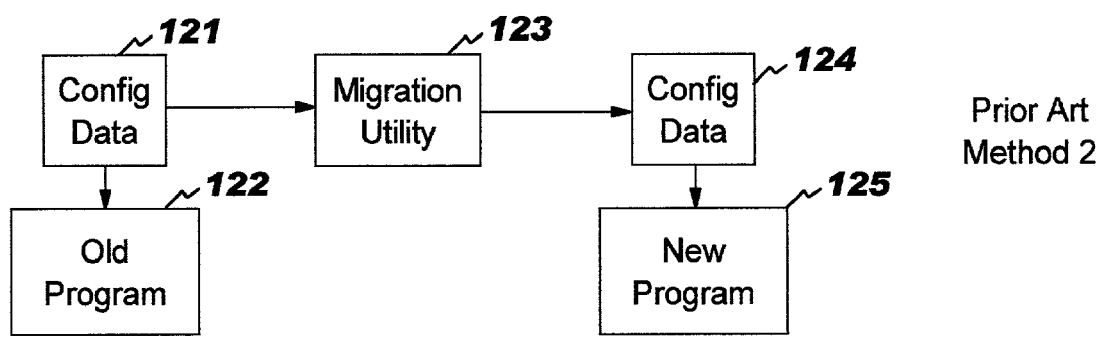
FIG. 1B — Prior Art Method 2
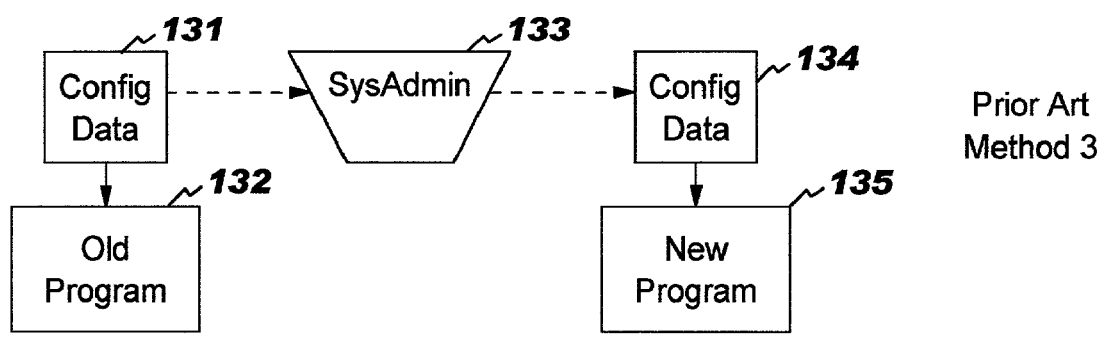
FIG. 1C — Prior Art Method 3
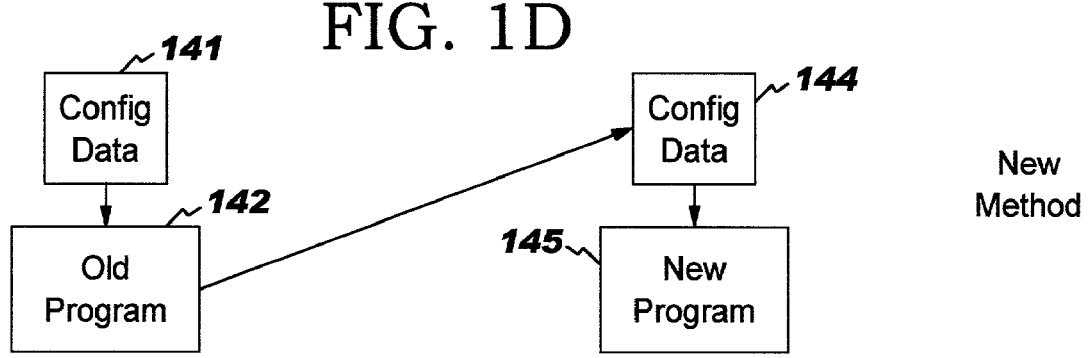
FIG. 1D — New Method

EFFICIENT CONFIGURATION DATA MIGRATION TECHNIQUE

BACKGROUND OF THE INVENTION

1. Field of the Invention

The present invention relates to computer software, and deals more particularly with methods, systems, and computer program products for migrating configuration data used by an existing executable computer code to a replacement executable computer code. Configuration data is gathered by a pre-existing, first executable computer code, formatted in a form suitable for use by a second executable computer code, and output so that it can be accessed by the second computer code upon invocation. This reduces the effort required to gather configuration data necessary to allow a second executable computer code to take over the functions of a first executable computer code.

2. Description of the Related Art

In today's rapid advance of technology, a computer system composed of software, firmware, and hardware is inevitably in a continuous state of change. In particular, the instruction sequences used to perform a useful and specific task within the context of the computer system can be implemented as software (generally, a stored sequence of instructions or codes which are copied into volatile computer memory for execution), firmware (as, for example, in read-only memory chips, where the instructions or codes are burned into the device executing them), hardware (as, for example, in programmable logic arrays, analog devices, ladder logic relays, etc.), or some combination of these different methodologies. These instruction sequences, also known as executable computer code or executable code, are distributed as products, or "executable products", which are selectively initiated and executed by the user according to the user's requirements. These executable products are executed within a computer system environment which undergoes continuous change. Such change is caused by many factors. Portions of the hardware upon which the executable product operates may be upgraded to replace old capabilities with new ones, and this necessitates concomitant changes in the executable product. Other executable products with which the subject executable product interacts may change as the result of enhancements or error corrections, and new executable products may be added to the computer system environment which will affect the performance of the subject executable product. Even if nothing on the computer system changes, there may be changes in external computer systems with which the computer system interacts, and these external computer system changes may necessitate changes in the subject executable product for compatibility or standardization reasons.

It is standard practice in the computer programming art to define sets of parameters defining commonly required values for use by multiple executable products within a particular computer system and which can be easily accessed by such products. These parameters are usually made available in the form of global tables or disk files called "configuration files" or "profiles". For example, these sets of parameters may contain values which identify the peripheral hardware devices currently configured in the hardware, the characteristics of the peripheral hardware, the status of the peripheral hardware, address assignments for communications ports, etc. These data may be characterized as identifying the general operating environment within which the executable products are expected to operate. Other sets of parameters characterize the configuration of the particular computer system upon which the executable product resides; such data are generally static, i.e. they do not necessarily change as the dynamic computing environment changes. For example, under a virtual operating system environment within which several operating systems may coexist, such as under the International Business Machines ("IBM®") MVS™ operating system, such data might be an identification of the operating system under which the executable product executes (e.g. UNIX, or OS/360), the type of disk file system that the executable product is expected to access, the locations of various system-related files, etc. ("IBM" is a registered trademark, and "MVS" is a trademark, of the International Business Machines Corporation, hereinafter "IBM".) Still other sets of parameters are unique to the executable product and contain information which allows the executable product to perform certain functions in a certain way. Each executable product, in order to make it capable of executing on general systems, will access these various sets of parameters and use those parameters which are pertinent to its operation. This allows the executable product to adjust its operation to accommodate various environmental conditions and thus be more universal in its usefulness.

It is often necessary on computer systems either to upgrade an existing executable product with a newer version of the same executable product or to replace an existing executable product with a different executable product. In either case, it often happens that there exists extensive configuration data used by the existing executable products. In order to install a replacement executable product, such existing configuration data must frequently be altered and reformatted for use by the replacement product, depending upon its requirements. This process is sometimes referred to as data migration. This process of data migration is often tedious, error-prone, and inconvenient.

In the prior art, there are generally three common methods for migrating configuration data. These three methods are depicted in FIGS. 1A, 1B, and 1C. According to the first method as depicted in FIG. 1A, the replacement executable product 115 "imports" the configuration data 111 of the existing executable product 112 by directly reading the configuration files 111 of the existing executable product 112 and then saving the configuration data 114 in the format that the replacement executable product accepts. Later invocations of the replacement executable product 115 would read its configuration data 114 in its standard operational format. This is most commonly done, especially when an executable product is updated with a newer version and the newer version uses a new format for configuration data. This method requires additional code to be implemented in the replacement executable product 115 to find, recognize, read, interpret, and error-check the configuration files 111 of the existing executable product 112. Such additional code is not normally required after the replacement operation and remains to unproductively consume computer system resources such as storage space. It also places a burden on the programmers responsible for maintaining the replacement executable code, in that the data migration code must be maintained and documented as long as the replacement executable product is viable.

According to the second method of migrating data as depicted in FIG. 1B, a separate executable product called a migration utility 123 is provided to read the specific configuration files 121 of the existing executable product 122, as well as the general configuration files required and/or maintained by other executable products (not shown in FIG. 1B) within the computer system environment; translate the data contained therein; and output the data as configuration files 124 in a format acceptable to the replacement executable product 125. This might be done in the prior art when the replacement executable product 125 is not aware of or able to read configuration files 121 from the existing executable product 122. This method has the disadvantage of requiring the design, coding, testing, and maintenance of an additional executable product that understands and translates between two different configuration file formats.

The third, and least desirable, method of migrating data is a manual process, depicted in FIG. 1C, in which the system administrator 133 or user manually creates configuration files 134 for the replacement executable product 135, e.g. by following instructions provided in the documentation for the replacement executable product 132, by inspection of the existing configuration data files 131, or other manual means. This method is very tedious and time consuming, prone to human error, and dependent upon the level of training and skill of the individual making the manual changes.

Both the first and second method have additional disadvantages and limitations. The biggest disadvantage is that the executable product 112, 122 being replaced may obtain its configuration information 111, 121 from many sources; however, not all of these sources are necessarily accessible to the replacement executable product. For example, consider a routing daemon which gets its configuration information from input files, start up "command line" parameters, and information learned in communication with its routing stack. If the new routing daemon obtains its configuration information from configuration files only, then neither the new routing daemon nor a stand-alone migration utility can access the command line parameters that would have been used to initiate the existing routing daemon. Furthermore, the replacement program does not have facilities for learning information from the routing stack which is internal to the old routing daemon, and instead expects to have that information defined to it. In such a case, the solution to this problem would be the third method for migrating data given above and to include extensive documentation with the replacement program directing the system administrator or user to manually provide the information.

Accordingly, improved techniques for migrating configuration data are needed.

SUMMARY OF THE INVENTION

An object of the present invention is to provide an improved data migration technique for migrating configuration data.

A further object of the present invention is to provide a data migration technique for implementation in an executable product to gather environmental and configuration parameters which are pertinent to a second, or replacement, executable product.

Yet another object of the present invention is to provide a data migration technique which will execute according to an external, asynchronous command received from an agent external to the executable product.

Yet another object of the present invention is to provide a data migration technique which will make the environmental and configuration parameters of an existing executable product available to the replacement executable product, the parameters being available on an external medium such as, for example, a computer disk file.

Yet another object of the present invention is to provide a data migration technique which may be performed while the executable product is executing its designated functions.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and executable products for migrating configuration data. This technique, as illustrated in FIG. 1D, preferably comprises implementing functionality in an executable product 142 which will, upon command, access configuration data 141 (along with optional startup command parameters, and/or dynamic environmental data not shown); retrieve selected data which are pertinent to the operation of a second, or replacement, executable product 145; format the selected data so that it can be accessed by the replacement executable product; and store the data persistently (for example, as one or more disk files or in electronically erasable programmable read only memory (EEPROM), designated as 144). In preferred embodiments, this technique is initiated by the receipt of an asynchronous command from an external agent. By way of example, such initiation may be the result of the execution of a batch file containing a scripted command, an automatic system scheduler which operates at a predefined time (such as at the startup of the host computer system) to execute scheduled executable products, or manual insertion of a command by an individual through an input device such as a keyboard or computer console. The invention may be implemented in the form of software, hardware, firmware, or some combination thereof.

The present invention provides a better way for achieving data migration than is available in the prior art. According to this invention, an existing executable product provides the configuration data needed for a replacement executable product. The existing executable product first gathers its own configuration data as required for normal operation, by such standard methods as reading its own configuration files, accepting command line parameters, reading external configuration files, and/or communicating with other programs. Once it has fully initialized, then, if so commanded, it creates a configuration file for the replacement executable product, for example, by reading its own internal tables and control blocks and then outputting the information to a new configuration file in the format needed by the replacement executable product.

In an additional embodiment, the disclosed techniques may be used to create a configuration migration utility, e.g. by taking the code of the existing executable product; deactivating or deleting all of its functions except those that read, process, and store configuration information; and inserting additional software code to output the information in the format needed by the replacement executable product.

The present invention will now be described with reference to the following drawings, in which like reference numbers denote the same element throughout.

BRIEF DESCRIPTION OF THE DRAWINGS

FIG. 1A is a diagram of a typical data migration method, designated as Prior Art Method 1, according to the prior art;

FIG. 1B is a diagram of a typical data migration method, designated as Prior Art Method 2, according to the prior art;

FIG. 1C is a diagram of a typical data migration method, designated as Prior Art Method 3, according to the prior art; and FIG. 1D is a diagram of the data migration method of the invention depicted for comparison purposes with the prior art.

DESCRIPTION OF PREFERRED EMBODIMENTS

Figure 2:
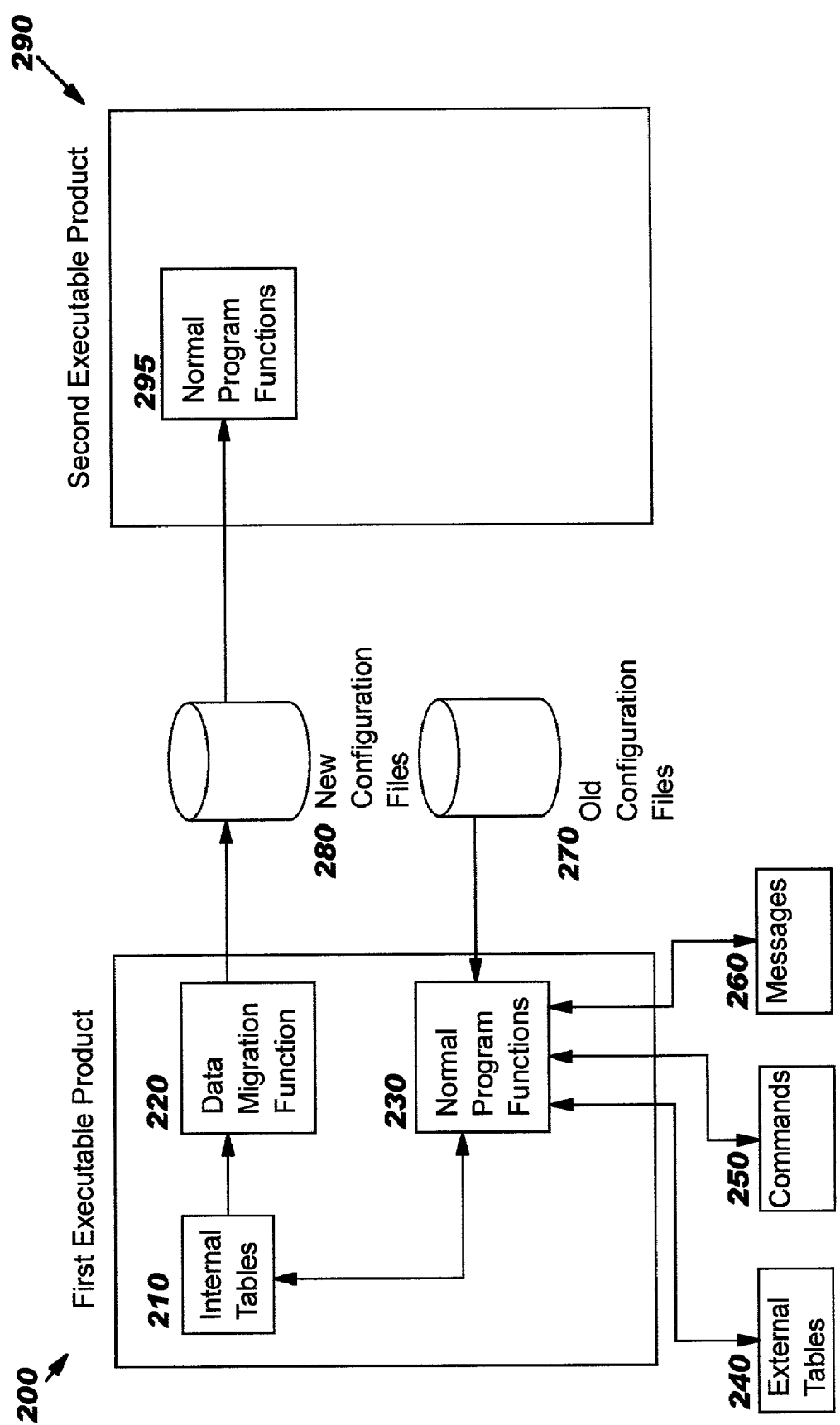
FIG. 2 provides a schematic diagram depicting an illustrative computer system environment within which the techniques of the invention may be described.

The present invention defines techniques for migrating configuration data. In a preferred embodiment, such data migration is performed programmatically by an existing executable product for a replacement executable product. The invention can best be understood by a particular embodiment as described herein. It should be understood that the described embodiment is given for example only; it illustrates the generic principles which comprise the invention and should not be considered to be limiting as to the scope of the invention.

As used herein, the term "executable product" is used synonymously with the terms programs, software, modules, and software processes. The term "tables" denotes any of a number of data structures which may include arrays, queues, variables, or any aggregate of such data structures, which are constructed and maintained by the executable product. An "internal" table denotes a table which is only accessible to the executable product that maintains it, while an "external" or "global" table denotes a table which may be accessible by any number of independent executable products. The illustrative embodiment presented herein is presented in the context of an IBM MVS operating system, but the principles could be implemented under any computer operating system which features system-level functions which support the execution of software code as described below.

The techniques of the invention are best understood with reference to a computer system environment having a complexity sufficient to illustrate the functions of the invention, as for example, in the illustrative context of a computer system environment running the IBM MVS operating system. The MVS operating system was designed to allow multiple independent operating systems to operate upon the same central processor and utilize the same, or nearly the same, resources, which includes the communications resources between the host system and other computer systems. The standard communications protocol originally used by IBM was called Systems Network Architecture, or SNA. As computer systems evolved, an experimental operating system called UNIX was developed by Bell Laboratories for the central processors made by numerous vendors. The communications protocols today known as Transmission Control Protocol and Internet Protocol (TCP/IP) were originally developed to operate under the UNIX operating system and its programming conventions. A significant amount of software has thus been written within the UNIX operating system to incorporate the TCP/IP protocol. (The details of the UNIX operating system became well known to those skilled in the art.) The MVS operating system was subsequently enhanced to include the TCP/IP protocol along with the SNA protocol.

It became apparent that MVS users could gain access to additional software capabilities if the UNIX operating system were integrated within the MVS environment. The MVS operating system was enhanced to implement and integrate the capabilities of the UNIX operating system, which had its own conventions, file structures, and services. This particular implementation is termed z/OS™ UNIX and it coexists with traditional MVS functions and traditional MVS file types (which are different from the generic UNIX file types). The z/OS UNIX system concurrently allows access to UNIX files and to UNIX utilities and commands by users within the MVS environment by means of application programming interfaces (APIs) and the interactive shell environment. Subsequently, through the z/OS UNIX system services, the MVS users gain access to additional communications software capabilities. ("z/OS" is a trademark of IBM.)

The z/OS Communications Server was implemented to provide both SNA and TCP/IP networking protocols for z/OS UNIX within the MVS operating system. It supports two environments: a native MVS environment in which users can exploit TCP/IP protocols in standard MVS application environments such as batch jobs, started tasks, Time Sharing Option (TSO), CICS® applications, and IMS™ applications; and a z/OS UNIX environment in which the user can create and use applications that conform to UNIX standards. ("CICS" is a registered trademark, and "IMS" is a trademark, of IBM.) The z/OS Communications Server is implemented as a suite of individual programs having specific functions, some of which are implemented as so-called "daemons". A daemon process is one which performs continuous or periodic functions, for example, a routing function or process which maintains the communications network status for purposes of routing messages between addresses known to the network. Daemons are programs that are typically started when the operating system is initialized and remain active to perform standard services. It should be apparent from the prior discussion that a routing daemon must take into consideration the particular operating system (MVS or UNIX), the file structure recognized by each operating system, the particular communications protocol, details concerning the current topology of the communications network, static and dynamic routes, etc.

Initially, the routing daemon for the previously-described MVS computer operating system environment was designated as OROUTED, and it implemented a routing algorithm called the Routing Information Protocol, or RIP. Later, as verison 2 of RIP (i.e. RIP2) was implemented, the RIP implementation within OROUTED was enhanced to support RIP2. The OROUTED daemon was further enhanced and incorporated as one of the z/OS Communications Server applications. As the communications system and the computer system evolved, a new routing protocol called Open Shortest Path First (OSPF) became widely used. It became necessary to develop a new routing daemon, termed OMPROUTE, which would implement both RIP and OSPF protocols as well as accommodate enhanced/new system conventions in both MVS and UNIX which were concurrently being implemented. However, not all users necessarily desire to upgrade to the newer OMPROUTE routing daemon for various reasons.

It became desirable to provide an upgrade path by which a user could migrate the configuration and environment used by OROUTED to OMPROUTE with a minimum of disruption to existing operations and a minimum of human interaction. Although both routing daemons OROUTED and OMPROUTE are supported by IBM, the OMPROUTE routing daemon is preferred because of its conformance to more modern routing standards. The technique of the present invention was incorporated into OROUTED to provide a migration tool for programmatically converting an OROUTED configuration to an OMPROUTE profile.

When the OROUTED daemon is instrumented according to techniques of the present invention, it will respond to the receipt of a command by examining internal tables and then create a new file with corresponding configuration statements formatted in a syntax recognizable by the OMPROUTE daemon. This instrumentation takes advantage of the existing OROUTED computer code which creates internal tables during the normal OROUTED initialization procedure by reading statements in existing configuration disk files (normally a profile and a gateways file), as well as accessing the TCP/IP stack (described later); parsing and validating these statements; encoding the information contained therein for internal use; and then saving the encoded information in an internal format in its internal tables; new code to perform these functions is not necessary for the invention. The creation of the new configuration files is controlled by a command line parameter. In the case of the particular OROUTED implementation, a command line parameter also dictates whether the OROUTED daemon will terminate after completing the OMPROUTE profile or continue processing in its normal manner.

A majority of the statements in the OROUTED profile and gateways files, as well as selected information from the internal tables derived from the TCP/IP stack, are converted into statements in the new conversion file format. Other OROUTED statements are not applicable to the operation of the OMPROUTE daemon and are thus not converted. For example, in one type of communications environment, external routes designated as static routes must be identified by statements in the OROUTED configuration files, but they will not be converted since OMPROUTE learns of static routes from the TCP/IP stack, an area of dynamic environmental data to which other services in the z/OS Communications Server suite contribute. In another communications environment, external routes designated as passive routes must be explicitly defined to OROUTED and are not defined to the TCP/IP stack. OROUTED cannot distinguish between these two cases without interfacing to the stack, and OROUTED does not presently interface to the TCP/IP stack. To convey the necessary indication of an external passive route to OMPROUTE, the OROUTED daemon will add a comment to the OMPROUTE profile to describe the two cases for external routes and what should be done. For this situation, OROUTED is instrumented to insert a comment describing the situation, so that the system administrator can be reminded to manually insert the required parameters.

When all the required data has been accessed, formatted, and output to the OMPROUTE profile by OROUTED, the OMPROUTE profile will be put in the /tmp directory if the directory permissions allow OROUTED write access; if not, an appropriate message will be provided. The profile is stored in a temporary directory to avoid possible interference with an instance of the OMPROUTE daemon that may already be executing; for this reason, it is desirable not to overwrite any existing OMPROUTE profiles. Also, the temporary storage of the profile in a known directory allows the system administrator the opportunity, if desired, to inspect the profile for reasonableness and to modify the statements in the new OMPROUTE profile or other files according to the comments that may have been inserted, and to insert additional statements which may apply to the environment in which OMPROUTE is to run, e.g. a test environment with dummy static routes. The system administrator may also optimize the profile based upon factors which may not be available to either OROUTED or OMPROUTE.

It is instructive to examine a specific instance of data migration according to the above-described example. It is not necessary to understand the specific formats, but such an example should show the manner in which the invention is implemented. Assume that the following OROUTED profile file (without a gateways file), designated as OROUTED.PROFILE, contains the following parameters:

```
OROUTED.PROFILE
    RIP_SUPPLY_CONTROL: RIP2
    RIP_RECEIVE_CONTROL: RIP2
    RIP2_AUTHENTICATION: "PASSWORD"
```

This file would normally be read by OROUTED in performing its normal functions. Assume that OMPROUTE uses a profile file having a set of statements and a syntax which are different from those required by OROUTED. When instrumented according to the principles of the invention, OROUTED will, upon command, generate the following new OMPROUTE profile file using data from the previously described old file, as follows:

```
CNVROUTED.PROFILE
    RIP_Interface
        IP_Address=ALL
        Name=IGNORED
        Subnet_Mask=255.255.255.255
        Receive_RIP=RIP2
        RipV2=Yes
        Authentication_Key= "PASSWORD"
```

As a second example, assume that the previously defined OROUTED profile file is used but in addition, the following gateway file, designated as GATEWAY.FILE, is used by OROUTED:

```
GATEWAY.FILE
    net 1.1.1.1 gateway 1.1.1.2 metric 2 external mask 255.255.255.0
    host 2.2.2.1 gateway 2.2.2.2 metric 2 passive mask 255.255.255.0
    options interface TR1 2.2.2.4 supply.control rip1
    options interface TR1 2.2.2.4 receive.control rip1
    options interface ETH1 2.2.2.5 forward 2.2.2.6 fmask 255.255.255.0
    options interface VIPA1A 2.2.2.8 ripoff
    options gateway 2.2.2.9 block
```

In this example, OROUTED uses two configuration files (a profile and a gateways file) and OMPROUTE uses only a single configuration file (a profile). The data migration tool of OROUTED, instrumented according to the techniques of the present invention, will accordingly generate the following OMPROUTE profile file:

```
CNVROUTED.PROFILE
    ;If route not defined in TCPIP profile, add following filter statement,
    ; Filter=(noreceive,1.1.1.2,255.255.255.0);
    ; If route is defined in TCPIP profile, no change for this file.
    ; Define passive static route using the BEGINROUTES block in the
    ; TCPIP profile.
    ; BEGINROUTES
    ; ROUTE 2.2.2.1/32 2.2.2.2 LINK1 MTU defaultsize REPL
    ; ENDROUTES
    RIP_Interface
```

-continued

```
        IP_Address=2.2.2.4
        Name=TR1
        Subnet_Mask=255.255.255.0
        Out_Metric=1
        RIPV2=Yes
        Authentication_Key="PASSWORD"
        Send_Static_Routes=YES
        MTU=1024; ;value from BSROUTINGPARMS in
        PROFILE.TCPIP
    RIP_Interface
        IP_Address=2.2.2.5
        Name=ETH1
        Subnet_Mask=255.255.255.0
        Out_Metric=1
        RIPV2=Yes
        Authentication_Key="PASSWORD"
        Send_Static_Routes=YES
        Filter=(send, 2.2.2.6, 255.255.255.0)
    Interface
        IP_Address=2.2.2.8
        Name=VIPA1A
        Subnet_Mask=255.255.255.0;
    Send_Only=DEFAULT
    Originate_RIP_Default_Condition=Always;
    IGNORE_RIP_NEIGHBOR IP_address=2.2.2.9;
```

As can be seen above, comments, i.e. the statements with a leading semicolon, have been programmatically inserted to provide instructions to the system administrator.

A third example is illustrative of the case in which OROUTED receives a command line parameter which is subsequently stored within its internal tables for configuring its operation, and the command line parameter is pertinent also to the operation of OMPROUTE. The OROUTED daemon is implemented to recognize the command line parameter "-h" which directs OROUTED to include host routes in addition to network routes in its routing tables; the host routes are dynamically based upon TCP/IP configuration data or learned dynamically from RIP updates; the details of these actions are not important in understanding the invention. The data migration tool of OROUTED, instrumented according to the techniques of the present invention, will accordingly generate the following OMPROUTE statements in the profile file:

```
        RIP_Interface
            IP_address=ALL
            Name=
            Subnet_mask=255.255.255.0
            Send_Host_Routes = YES;
```

The "Name=" statement is not relevant in this situation and therefore ignored by OMPROUTE.

Attention is now directed to FIG. 2, which depicts an embodiment of a system having a first executable product 200 and a second executable product 290, in which the technique of the invention is implemented. Generally, the first executable product 200 may be an existing product which is being replaced, enhanced, or upgraded, and the second executable product 290 may be a replacement or new executable product intended to eventually take the place of the first executable product 200. As shown, the first executable product 200 has been instrumented with a data migration function 220 according to the invention. The first executable product 200 is invoked by a command 250 from an external agent, which may be in the form of a person entering a command on a computer console, execution of a batch file containing a scripted command, or an automatic system scheduler which executes at a predefined time (such as at the startup of the computer system). Other methods of initiating the execution of the first executable product 200 may be used without departing from the scope of the invention. Command line parameters may be associated with the command which will place the first executable product 200 into a particular mode or provide it with current information for execution. During routine operation, the first executable product 200 may have the capability to receive and respond to asynchronous commands from the aforementioned console, batch file, or system scheduler.

Upon startup of the first executable product 200, it accesses data from external tables 240, commands 250, messages 260, and/or configuration files 270 to configure itself for operation. Typically, these data will be manipulated and stored in internal tables 210 which are local to the first executable product 200, for use by the normal program functions 230 of the first executable product 200. The data migration function 220 may then be invoked depending upon whether or not such an action has been directed by action of the external agent. Such a command may be received upon startup of the first executable product 200 or during operation of its normal program functions 230, and its receipt may initiate the setting of a flag or similar indication in the internal tables of the first executable product 200 that the data migration function 220 is to be initiated. The data migration function 220 monitors the status of this flag or similar indication in the internal tables 210 for direction that it is to perform its function. Such monitoring may be accomplished by standard techniques known to the art, such as polling the flag, callbacks, asynchronous interrupts, and the like.

When so directed, the data migration function 220 accesses data which may be pertinent to the configuration of the second executable product 290, either indirectly from the internal tables 210 or directly by accessing the external tables 240, commands 250, messages 260, and/or configuration files 270; the direct accessing of these sources is not shown in FIG. 2, but may be accomplished in lieu of indirectly accessing these data through the internal tables 210 as shown without departing from the concept of the invention. The data migration function 220 will contain logic which will assemble these data into a format meaningful to the second executable product 290 and output these data in the form of configuration files 280 for storage within the computer system. These configuration files 280 are generally disk files when persistent storage over time is desired, but configuration files 280 may be in the form of other types of storage devices such as volatile memory; EEPROM; write-only or rewriteable compact disk read only memory (CDROM); and the like. The requirement is to retain these data for sufficient time duration to allow them to be accessed by the second executable product 290. When the second execution product 290 is invoked, it will input its data from the configuration files 280 without distinguishing whether or not such data was programmatically generated, as described heretofore, or manually generated by the system administrator or some other user.

This system and method is best illustrated by the example of the OROUTED and OMPROUTE routing daemons described previously, in which the OROUTED routing daemon is considered to be the first executable product 200 and the OMPROUTE routing daemon is considered to be the second executable product 290. The OROUTED routing daemon 200 will go through a startup sequence in which it will access its two external configuration data files 270, a profile file and a gateways file, to obtain data necessary for it to adjust its internal tables 210 for real-time execution and to determine the current state of the host operating system and other currently operating programs. It will also send messages 260 to other routing daemons residing on other computer systems to request responses regarding current routing data. These routing data are received in the form of messages 260; the details of how these messages are formatted is not pertinent to the present invention. These data are decoded and stored in the internal tables 210 of OROUTED. The normal program functions 230 of OROUTED initialize the routing daemon for operation, send and receive routing messages, and maintain the status of the communications network in terms of routing data therethrough.

The OMPROUTE routing daemon 290 is a replacement product for the OROUTED routing daemon 200, inasmuch as it incorporates newer features in its design. In its current design, OROUTED 200 implements a standard routing algorithm designated as RIP. The OROUTED routing daemon 200 is maintained by a standard software maintenance procedure for correcting errors and providing enhancements within the scope of the RIP protocol. However, it is desirable to implement a newer routing algorithm called OSPF which is being used by other computer systems, in order to maintain compatibility and interoperability with these external computer systems. It is not cost-effective to implement a change of this magnitude in OROUTED routine daemon 200 for various reasons, e.g. a mechanism for reading the TCP/IP stack would be necessary and this would entail extensive reconfiguration of existing internal logic and tables of OROUTED. Therefore, the decision is made to develop a replacement routing daemon in the form of OMPROUTE which implements both RIP and OSPF along with other logic for differentiating between the two protocols and responding appropriately. Because of system maintainability and interoperability considerations, it is desirable for the OMPROUTE daemon 290 to eventually replace the OROUTED daemon 200 in all installations. However, the OMPROUTE daemon 290 will have its own requirements for configuration data inasmuch as it implements functions which are not contained in the OROUTED daemon 200. The format of these configuration data as stored in the profile and gateways files 280 may be different than the configuration files 270 of the OROUTED daemon 200. There may be a number of reasons for this difference. For example, the OMPROUTE daemon may be developed as part of a larger software package with different formatting standards than those used by OROUTED. It may be developed by programmers who had no knowledge of OROUTED and its standard formatting. It may have to conform to the standards of a different computer system manufactured by a different vendor than that of OROUTED. Whatever the reason, it will be assumed that the format of the sets of profile and gateway files 270, 280 used by OROUTED and OMPROUTE, respectively, are different. Note also that the file structuring used by OROUTED and OMPROUTE may also be different, e.g. OMPROUTE may only have a single configuration file (a profile), whereas OROUTED may have two (profile and pathway files); there is no assumption made as to whether or not there is a relationship between the number of configuration files referenced by each of the two daemons.

According to the invention, the OROUTED daemon is modified (preferably through a standard software modification procedure used in the office maintaining the OROUTED product) to add a data migration function 220 which will create new configuration files 280 formatted according to the requirements of OMPROUTE. In preferred embodiments, a new OROUTED command line parameter "-c" is added to the OROUTED functionality to indicate that the OROUTED daemon is to create OMPROUTE configuration files 280 from its current internal tables 210. If "-c" is specified as a startup parameter when OROUTED is invoked initially, then the OROUTED daemon will initialize itself, create its internal tables 210 based upon external configuration files 240, command line parameters 250, and routing data from other computer systems 260; write the appropriately formatted profile and gateway files 280 for OMPROUTE; and terminate. If "-c" is specified as an asynchronous command during processing, then OROUTED will continue processing after creating the OMPROUTE configuration files 280. In either case, the system administrator or user may take the new configuration files 280 and put them in an appropriate directory for inspection, modification, and approval. At a later time when the decision is made to change over to using the OMPROUTE daemon 290, OMPROUTE will read these new configuration files 280 as part of its startup procedure.

Figure 3:
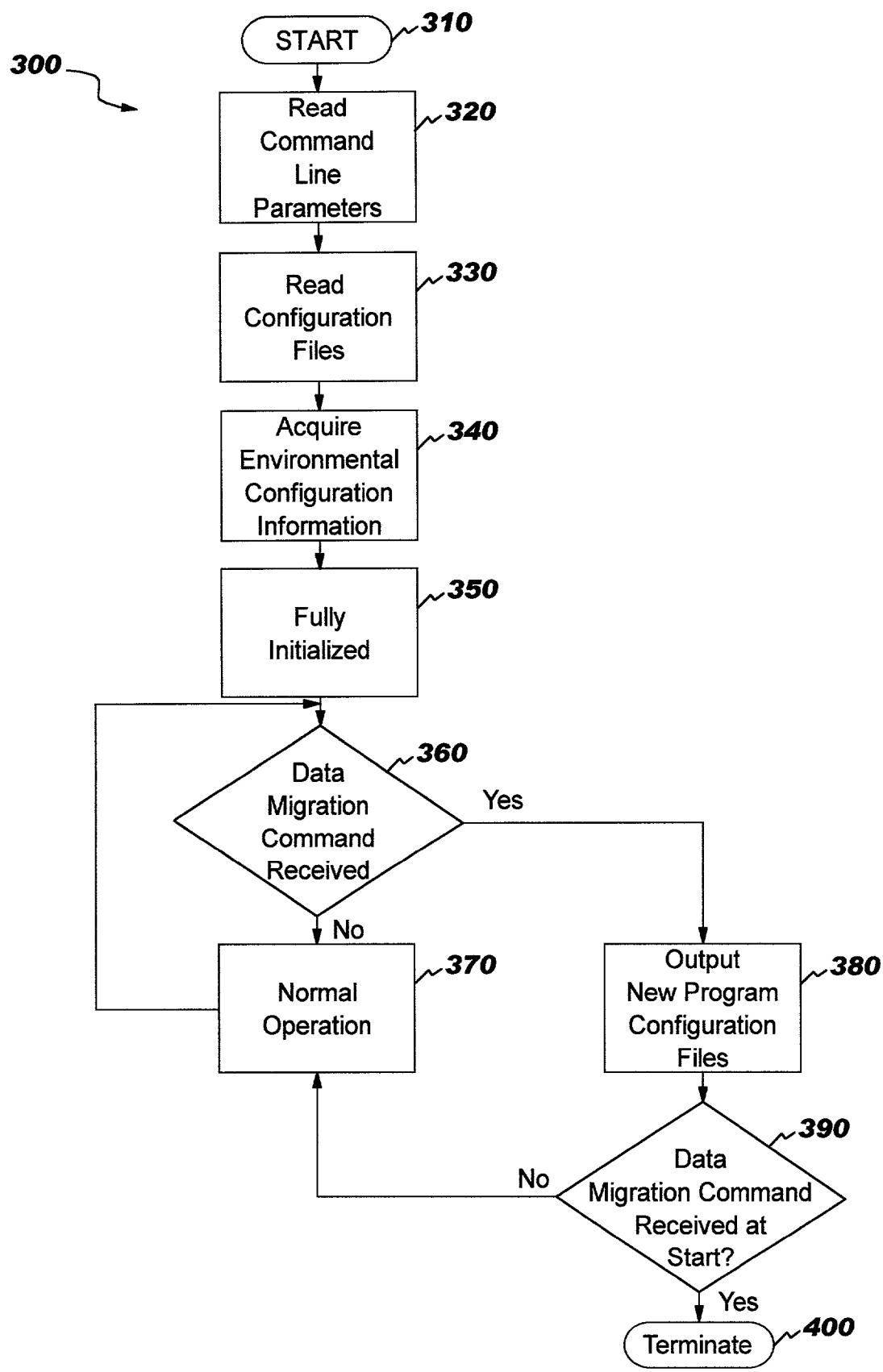
FIG. 3 provides a flowchart depicting logic which may be used to implement preferred embodiments of the invention.

Referring now to FIG. 3, in which a general flowchart is given to illustrate the techniques of the invention, the operation of the data migration function 300 is shown. In preferred embodiments, this function is invoked through the logic of the existing executable product 200 (FIG. 2). In the block indicated as 310, the program or process which implements the invention is initiated through the action of an external agent. One such external agent performing program initiation may be the manual input of a command line with initial parameters from a computer console. For example, in an MVS system, this act might be accomplished as an interactive command initiated under TSO. Another external agent causing program initiation may be the use of scripted batch files. An example of this method within the framework of the MVS operating system may be the use of a file containing statements written in Job Control Language (JCL), in which the name of the program is given in the keyword parameter PGM and the parameters associated with the program invocation are given in the keyword parameter PARMS. Still another external agent causing program initiation might be the use of a scheduler program as part of the operating system, in which the program might be initiated as part of a standard system startup sequence or as a scheduled event at some time during the day. It should be understood that the foregoing examples do not limit the different external agents which may be called upon to perform program initiation. Furthermore, use of internal triggering mechanisms is within the scope of the present invention, where these triggering mechanisms are preferably included in the existing executable product 200 when it is being instrumented according to the present invention. As one example of this type of internal trigger, conditional programming language statements might be added which operate on a particular date.

In the block designated as 320, the program or process will perform a portion of its normal startup processing, in which it will read any command line parameters which were associated with this particular initiation act. In one of the previous examples, the PARMS keyword during a batch file execution would contain values necessary to instruct the program to execute its functions in a certain way. One such command line parameter pertinent to this detailed description is one which will instruct the program to output files containing reformatted configuration information, as will be seen later. According to the pre-existing code of the existing executable product 200 (FIG. 2), the program will perform standard verification of values, error checking, and the like to ensure that the parameters are usable by the program. Also according to the existing code, these data will be stored in internal table structures of the program. The techniques of the present invention therefore preclude the need to write complicated and additional verification and error-checking code for the data being migrated, since the pre-existing code for the startup and initialization of the existing executable product 200 can be used.

In the block designated as 330, the program or process will perform another portion of its normal start processing, in which it will read configuration files which are used by the program to tailor itself to the operating environment. In the case of the OROUTED daemon, for example, a configuration file called a profile, described previously by example, contains a set of scripted values and keywords which instruct the OROUTED daemon to use a particular password when performing authentication or to use a particular variant of RIP. The values typically contained in this particular profile are concerned with network operating philosophy and global standards to be used by all processes associated with the network. The program will again perform standard verification of values, error checking, data ranges, and the like, and incorporate the data into its internal table structures using its pre-existing code.

In the block designated as 340, the program will perform yet another portion of its normal startup processing, in which it will acquire environmental configuration information available within the dynamic environment. Such data is typically dependent upon the current environmental conditions which exist within the computer operating environment and may comprise the contributions of a number of different, independent processes. In the example of the OROUTED daemon, it operates as part of the z/OS Communications Server TCP/IP protocol suite (also called the "TCP/IP stack" or simply "the stack") whose functions include associated applications, transport- and network-protocol layers, and connectivity and gateway functions. Each of these functions, including the OROUTED daemon, contributes data which describes its current working configuration to the stack. Many of these data are necessary for proper functioning of the OROUTED daemon.

The program is considered to be fully operational and initialized with the block designated as 350. It should be noted at this point that this description of startup initialization functions should not imply a particular order of performance. The order in which the functions performed in blocks 320, 330 and 340 is immaterial to the practice of the invention. Additionally, not all functions will be necessary in every data migration application, and other data migration applications may employ additional configuration functions, such as, for example, the acquisition of real-time information by reading the outputs of sensors. It should be understood by those skilled in the art that the functions described herein as part of startup processing are representative of the types of operations which are performed under the rubric of initialization, and the specific functions presented are neither exhaustive nor limiting.

A decision will be made according to block 360 as to whether or not a command to perform data migration has been received. If no command is received, then the program will perform its normal operating functions as depicted in block 370. If a command to perform data migration has been received, then the data migration function will be performed as depicted in block 380, where configuration data is gathered from the program's internal tables. The program knows the data which is pertinent and necessary to another, second program by virtue of the instrumentation of the first program, according to the techniques of the present invention. This gathered data is output, according to a specified format, to an external area, normally in the form of disk files. The specified format is also defined during the instrumentation of the first program. In another embodiment of the invention, configuration data may be provided for multiple such second programs or multiple versions of a second program, in response to command options which identify the second program or version of a specific second program for which the configuration data files are to be generated. Similarly, the output object may optionally be in the form of a disk file, a read-only memory chip, programmable array, paper tape, card deck, or any form of media upon which data is normally stored, or in any combination of such forms, depending upon the requirements of the second program.

After performing the data migration function depicted by block 380, a decision is made according to block 390 as to whether the command to perform data migration was received at startup or during normal operation of the program. If the data migration command was received during normal operation of the program, then operation of the program continues with block 370. If the data migration command was received as a condition, parameter, or option at startup of the program, then the program initiates a termination process as depicted in block 400. The program may perform such actions as, in the case of a command, asking the user for verification of the action about to be performed, i.e. termination. Other such actions could be performed without departing from the technique of the invention.

In an alternative embodiment, as was briefly discussed above, the techniques of the present invention may be implemented as a data migration utility program, whereby the existing executable program is converted to become the data migration utility. This may be accomplished by disabling or deleting portions of the existing program that are unrelated to data gathering, and then instrumenting the program to output the gathered data in the required format. In this embodiment, the above-described process as shown in FIG. 3 can be simplified by replacing the operations depicted by blocks 360, 370, 380, and 390, with the function of gathering selected data from the program's internal tables, arranging it into a format suitable for the replacement program, and outputting the data as configuration files for the new program, i.e. the functions in block 380. In still another embodiment of the invention, this data migration utility program might be implemented by rewriting the pertinent functions for use in the data migration utility program, as described in the previous embodiment, and then incorporating additional useful functions which are pertinent to data migration. For example, such a function might be a data base function, whereby formats required by different second executable products or different versions of the first executable product are stored in a format database and accessed, so that the data migration utility might have a more universal use. Another example might be the decoding and interpretation of additional command parameters to select from different formats contained in the format database.

The present invention comprising new and non-obvious data migration methods, systems, and computer products has several advantages. First, there is no need to augment the code in the second executable product to read the configuration files of the existing executable product or to obtain dynamic environmental configuration data obtainable by the existing executable product and used to build its internal tables. Instead, the existing executable product is updated to output its internal configuration information in a format acceptable by the second executable product. It is much easier to write out configuration data, requiring only that the control blocks be traversed and the information written out in a specific format, than it is to read configuration data, which may require extensive parsing logic, syntax checking, consistency checking, error checking, range checking, and other such validation and verification operations. The invention reduces the additional coding effort since the logic for reading the configuration data and obtaining information from internal tables based on environmental configuration data is already implemented in the existing executable product, since it obviously has logic to read and check its own configuration files and internal tables.

Secondly, the invention solves the problem of providing configuration data from configuration files and dynamic environmental data which may not be accessible to the second executable product, as in the case, for example, of configuration data dynamically obtained over communications links from other computer systems or from command line parameters. These data are accessible to the existing executable product through its internal tables, and such access would not necessarily be available to the second executable product or a migration utility.

Third, the configuration file(s) for the second executable product can be generated before it is installed, since all data collection and formatting is accomplished by the existing executable product beforehand. This prior data collection and formatting allows users such as system administrators to review the configuration data prior to the installation of the second program and to modify it if necessary (for example, according to non-programmatic requirements or policy). This is an advantage in highly controlled environments in which policy requires a review of configuration files before installing new software. Furthermore, this review can be accomplished at a time when the reviewer is not under the pressure of running the installation.

Finally, voluminous and interrelated data contained in existing configuration files can be programmatically accessed and reformatted for use as new configuration file data without extensive human intervention. This promotes the reuse of configuration data which may have evolved over time so that the rationale for either creating the configuration data or arranging it in a certain way is not lost. Often the volume of such data is considerable and spread across numerous configuration files. Requiring human intervention to examine such data and reformat it according to the requirements of a new or replacement program would invite numerous errors and take an inordinate amount of time depending upon the volume of data. Programmatic data migration in the manner described herein reduces such human error and speeds the process, especially when a high volume of complicated configuration data is involved.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A computer program product for migrating configuration data from a first executable code to a second executable code, the computer program product comprising:
   computer readable storage medium having computer readable program code embodied in said medium, the computer readable program code comprising:
   computer readable program code configured to access data from external tables, commands, messages and/or configuration files upon startup of the first executable product to configure the first executable product for operation;
   computer readable program code configured to manipulate and store the accessed data in internal tables for use by the first executable product;
   computer readable program code configured to receive a command from an external agent, wherein the external agent is a scripted command issued through execution of a batch file;
   computer readable program code configured to obtain, responsive to the received command, configuration data available to the first executable code which is useful to the second executable code, the obtained configuration being obtained from the internal tables and/or directly from the external tables, commands, messages and/or configuration files;

computer readable program code configured to arrange the configuration data according to a format usable by the second executable code; and computer readable program code configured to write the data to one or more external media for access by the second executable code, wherein the first executable product comprises OROUTED and the second executable product comprises OMPROUTE.

2. The computer program product according to claim 1, wherein the external media are persistent.

3. The computer program product according to claim 2, wherein the external media comprise one or more disk files.

4. A computer program product for migrating configuration data from a first executable code to a second executable code, the computer program product comprising:

computer readable storage medium having computer readable program code embodied in said medium, the computer readable program code comprising:

computer readable program code configured to access data from external tables, commands, messages and/or configuration files upon startup of the first executable product to configure the first executable product for operation;

computer readable program code configured to manipulate and store the accessed data in internal tables for use by the first executable product;

computer readable program code configured to receive a command from an external agent, wherein the external agent is a system scheduler that issues the command at a pre- determined time;

computer readable program code configured to obtain, responsive to the received command, configuration data available to the first executable code which is useftil to the second executable code, the obtained configuration being obtained from the internal tables and/or directly from the external tables, commands, messages and/or configuration files;

computer readable program code configured to arrange the configuration data according to a format usable by the second executable code; and computer readable program code configured to write the data to one or more external media for access by the second executable code, wherein the first executable product comprises OROUTED and the second executable product comprises OMPROUTE.

5. A computer program product for migrating configuration data from a first executable code to a second executable code, the computer program product comprising:

computer readable storage medium having computer readable program code embodied in said medium, the computer readable program code comprising:

computer readable program code configured to access data from external tables. commands, messages and/or configuration files upon startup of the first executable product to configure the first executable product for operation;

computer readable program code configured to manipulate and store the accessed data in internal tables for use by the first executable product;

computer readable program code configured to receive a command from an external agent;

computer readable program code configured to obtain, responsive to the received command, configuration data available to the first executable code which is useful to the second executable code, the obtained configuration being obtained from the internal tables and/or directly from the external tables, commands, messages and/or configuration files, wherein the data is obtained from one or more internal control blocks accessible by the first executable code and wherein the internal control blocks were constructed by the first executable code using configuration files and command line parameters;

computer readable program code configured to arrange the configuration data according to a format usable by the second executable code; and computer readable program code configured to write the data to one or more external media for access by the second executable code, wherein the first executable product comprises OROUTED and the second executable product comprises OMPROUTE.

* * * * *